(12) United States Patent
Krishnamurthi et al.

(10) Patent No.: US 8,285,331 B2
(45) Date of Patent: *Oct. 9, 2012

(54) SYSTEM AND METHOD FOR BASE STATION INITIATED CALL SETUP (75) Inventors: Rajeev Krishnamurthi, San Diego, CA (US); Roy F. Quick, San Diego, CA (US); Bibhu Mohanty, San Diego, CA (US); Robert H. Kimball, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/475,793

(22) Filed: Jun. 26, 2006

(65) Prior Publication Data

US 2006/0246923 A1 Nov. 2, 2006

Related U.S. Application Data (63) Continuation of application No. 09/739,923, filed on Dec. 19, 2000, now Pat. No. 7,069,046, which is a continuation of application No. 09/023,804, filed on Feb. 13, 1998, now Pat. No. 6,188,892.

(51) Int. Cl.
*H04M 1/38* (2006.01)
*H04M 1/00* (2006.01)
*H04W 68/00* (2009.01)
*H04W 24/00* (2009.01)
*H04B 17/00* (2006.01)

(52) U.S. Cl. ........ 455/561; 455/423; 455/424; 455/458; 455/550.1; 455/560; 455/67.11

(58) Field of Classification Search .... 455/126.1–126.4, 455/127, 129, 126, 334, 352–353, 557–558, 455/560–561, 115.1, 115.2, 115.3, 115.4, 455/456.1–456.6, 458, 461, 24, 466, 500, 455/502, 507, 509, 2.01, 401, 3.05, 403, 455/414.2, 418, 517, 422.1, 423–425, 550.1, 455/67.11, 556.2, 67.14, 69–70, 410–411, 455/414.1, 414.3, 432.3, 445, 515; 370/332–333, 370/341, 352–353, 328–329, 349; 702/69, 702/184, 188; 375/220–221, 224–228; 379/1.01, 379/9.02, 15.03, 69, 77, 21, 22.01
See application file for complete search history.

(56) References Cited

U.S. PATENT DOCUMENTS 4,901,307 A 2/1990 Gilhousen et al.
(Continued)

OTHER PUBLICATIONS

"IS-95-A Mobile Station—Base Station Compatibility Standard for Dual Mode Wideband Spread Spectrum Cellular System," May 1995.

(Continued)

*Primary Examiner* — Meless Zewdu
(74) *Attorney, Agent, or Firm* — Kam T. Tam; Howard Seo (57) ABSTRACT

A system and method for performing base station initiated call setup is provided. A base station initiated call setup may be utilized to establish a test call, to deliver a packet data services call to a subscriber unit, or to reactivate a dormant packet call. The base station transmits a BS Service Request message to the mobile switching center, requesting initiation of the call. The mobile switching center will authorize the call if the call to be set up is directed to a subscriber unit located within the service area of the base station and if the service option to be used is authorized for the particular subscriber unit. The mobile switching center will allow or disallow the call depending on the state of the subscriber unit. The mobile switching center transmits a BS Service Response message to the base station, conveying the result of processing the BS Service Request message. If the base station initiated call setup is authorized and allowed, the call will generally proceed in the same manner as a subscriber terminated call.

45 Claims, 3 Drawing Sheets

U.S. PATENT DOCUMENTS

| | | | |
|---|---|---|---|
| 5,463,672 A | 10/1995 | Kage | |
| 5,502,725 A | 3/1996 | Pohjakallio | |
| 5,570,367 A | 10/1996 | Ayanoglu et al. | |
| 5,590,133 A * | 12/1996 | Billstrom et al. | 370/349 |
| 5,596,570 A * | 1/1997 | Soliman | 370/252 |
| 5,627,834 A * | 5/1997 | Han et al. | 370/241 |
| 5,734,977 A | 3/1998 | Sanmugam | |
| 5,802,105 A * | 9/1998 | Tiedemann et al. | 375/225 |
| 5,805,076 A * | 9/1998 | Ito et al. | 340/7.41 |
| 5,857,012 A * | 1/1999 | Paul | 379/32.04 |
| 5,884,148 A | 3/1999 | Bilgic et al. | |
| 5,884,196 A | 3/1999 | Lekven et al. | |
| 5,933,776 A | 8/1999 | Kirkpatrick | |
| 6,052,597 A * | 4/2000 | Ekstrom | 455/456.3 |
| 6,088,588 A * | 7/2000 | Osborne | 455/423 |
| 6,108,536 A * | 8/2000 | Yafuso et al. | 455/424 |
| 6,122,505 A | 9/2000 | Genell et al. | |
| 6,169,896 B1 * | 1/2001 | Sant et al. | 455/424 |
| 6,178,337 B1 | 1/2001 | Spartz et al. | |
| 6,188,892 B1 * | 2/2001 | Krishnamurthi et al. | 455/422.1 |
| 6,249,681 B1 * | 6/2001 | Virtanen | 455/466 |
| 6,272,547 B1 | 8/2001 | McWilliams | |
| 6,396,820 B1 | 5/2002 | Dolan et al. | |
| 6,519,252 B2 | 2/2003 | Sallberg | |
| 6,519,266 B1 | 2/2003 | Manning et al. | |
| 7,069,046 B2 * | 6/2006 | Krishnamurthi et al. | 455/561 |

OTHER PUBLICATIONS

"IS-634 Mobile Switching Center—Base Station Interface for Public 800 MHz,", Dec. 1995.

* cited by examiner

SYSTEM AND METHOD FOR BASE STATION INITIATED CALL SETUP

CLAIM OF PRIORITY UNDER 35 U.S.C. §120

The present Application for Patent is a continuation of patent application Ser. No. 09/739,923, filed Dec. 19, 2000 now U.S. Pat. No. 7,069,046, entitled "SYSTEM AND METHOD FOR BASE STATION INITIATED CALL SETUP", which issued as U.S. Pat. No. 7,069,046 which is a continuation of patent application Ser. No. 09/023,804, filed Feb. 13, 1998, entitled "SYSTEM AND METHOD FOR BASE STATION INITIATED CALL SETUP" which issued as U.S. Pat. No. 6,188,892; both are assigned to the assignee hereof and hereby expressly incorporated by reference herein.

BACKGROUND OF THE INVENTION

I. Field of the Invention

The present invention relates to communications. More particularly, the present invention relates to a system and method for base station initiated call setup.

II. Description of the Related Art

The use of code division multiple access (CDMA) techniques is one of several techniques for facilitating communications in which a large number of system users are present. Although other techniques such as time division multiple access (TDMA), frequency division multiple access (FDMA), and amplitude modulation (AM) schemes such as amplitude companded single sideband (ACSSB) are known, CDMA has significant advantages over these other techniques. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," assigned to the assignee of the present invention and incorporated by reference herein.

In the wireless CDMA system, a large number of wireless subscriber units, each having a transceiver, communicates through satellite repeaters or terrestrial stations which are also referred to as cells. Each cell includes a physical plant called a base station. A cell covers a limited geographic area and routes calls carried over subscriber units to and from a telecommunication network via a mobile switching center. When a subscriber moves into the geographic area of a new cell, the routing of that subscriber's call may be eventually made through the new cell by a process called a "handoff."

A subscriber unit transmits a signal that is received by a base station. The signal is then relayed to a mobile switching center which in turn routes the signal to the public switched telephone network and to telephone lines or other subscriber units. Similarly, a signal may be transmitted from the public switched telephone network to a subscriber unit via a base station and a mobile switching center. The communications channel allocated for communication of information between the subscriber unit and the base station is called the traffic channel.

The interface between the subscriber unit and the base station is referred to as the air interface. The telecommunications industry association (TIA) has provided a standard for CDMA call processing on the air interface entitled "IS-95-A Mobile Station—Base Station Compatibility Standard for Dual Mode Wideband Spread Spectrum Cellular System," which is incorporated by reference herein. The interface between the base station and the mobile switching center is referred to as the A interface. The TIA has provided for call processing on the A interface through the standard provided in "IS-634 Mobile Switching Center—Base Station Interface for Public 800 MHz," which is also incorporated herein by reference. IS-95-A and IS-634 both define the messages and signals that are sent on their respective interfaces for the operation of a CDMA wireless system.

The call flow in a CDMA system requires processing on both the air interface and the A interface. The successful progression of a call requires that the proper messages and signals are sent at the right times on both the air interface and the A interface. The IS-634 standard is being developed to provide for call processing on the A interface. A number of problems and deficiencies are present in IS-634 which currently does not support some of the necessary operations on the A interface.

One deficiency in IS-634 is in the lack of support for base station initiated call setup. Although IS-634 provides procedures for supporting subscriber unit initiated and network initiated call setup, procedures are needed to enable the base station to initiate call setup. Base station initiated call setup is needed for several reasons, such as the support of base station originated test calls and the support of packet data services calls.

Test calls are important during the initial deployment and re-engineering of the base station. The purpose of these calls is to generate statistics and analysis data which are specific to the base station. The data includes the frame error rate and link capacity estimates. These measurements are used as guidelines for properly configuring the base station.

Two types of test calls are the loopback call and the Markov call. The loopback call provides a loopback of traffic frames through a subscriber unit. It provides a means for a base station to supply a sequence of data blocks (frames) to a subscriber unit so that the transmitting and receiving performance can be measured. Using the loopback service option, the base station generates and sends traffic frames to the subscriber unit. After a delay to allow for processing, the mobile station sends the received frames back to the base station. The base station may then compare the transmitted frame with the received frame to determine if there was a frame error during the two-way transmission. The Markov call provides pseudo-random data for testing the traffic channel. The data is generated to emulate the characteristics of a voice/data call without having to involve actual users. Thus, pseudo-random data generated at a base station is transmitted to a subscriber unit, which performs frame error rate calculations and generates other statistics to characterize the quality of the link. Base station initiated call setup is necessary for the base station to initiate the loopback and Markov test calls.

Base station initiated call setup is also needed to support packet data services calls. In some situations, packet data services call may arrive for a subscriber unit either from a packet data network connected to a base station or a packet data network connected to a mobile switching center. When a packet data services call arrives via a base station, the base station must be able to initiate call setup in order to deliver the call to the subscriber unit.

In other situations, base station initiated call setup may be used to reactivate a packet data services call which is in a dormant mode. After a packet call has been set up, the call may enter a dormant mode if no packets are being transmitted for a period of time. In the dormant mode, the traffic channel is released. If packets are again received from the internet, the call needs to be reactivated, and the traffic channel needs to be set up again. Base station initiated call setup may be used to reactivate the dormant call.

These deficiencies are recognized and solved by the present invention in the manner described below.

SUMMARY OF THE INVENTION

The present invention is a system and method for providing improved messaging on the interface between a mobile switching center and a base station, also known as the A interface, of a wireless communication system. The present invention recognizes that the A interface, as previously defined by the IS-634 standard, does not allow for a base station to initiate a call setup. Base station initiated call setup is needed for several applications. For example, base station initiated call setup may be used to set up test calls during the initial deployment or reengineering of a base station. Test calls are conducted to obtain statistics, such as the link capacity and the error rate, for a particular base station. These statistics may then be utilized to enhance the performance of the base station. Base station initiated call setup may also be used to deliver packet data services calls to subscriber stations. In certain communications systems, a packet data network is coupled to a base station. When a packet call arrives for a subscriber unit located within the service area of a base station, the base station must be able to initiate call setup in order to deliver the call to the subscriber unit. In addition, base station initiated call setup may be used to reactivate a packet call already in progress. After a packet call has been set up, it may then enter a dormant mode if no packets are received for a period of time. If additional packets are then received, base station initiated call setup allows reactivation of the packet call in order to deliver the additional packets.

To initiate a call setup, a base station first obtains authorization and allowance from a mobile switching center to set up a call with a particular subscriber unit. The mobile switching center authorizes the call setup if it determines that call to be set up satisfies certain criteria. To authorize the call setup, the call to be set up should be of a service option that the subscriber unit is authorized to use. In addition, the subscriber unit should be located within the service area of the base station seeking to set up the call. The mobile switching center also determines if the call should be allowed. The mobile switching center, but not the base station, is cognizant of the state of the subscriber unit, i.e., the mobile switching center knows whether the subscriber unit is already involved in a call on the traffic channel. If the subscriber unit is already involved in a call, the mobile switching center may accommodate the new call through mechanisms such as service negotiation, or the mobile switching center may disallow the new call.

To initiate a call setup, a message generator in a base station generates a BS Service Request message, and a transceiver in the base station transmits the message to a mobile switching center. At the mobile switching center, a transceiver receives the BS Service Request message and passes the message to a message processor for analysis. The BS Service Request message identifies the subscriber unit to be called as well as the service option to be used for the call. Based on information stored in the mobile switching center's memory, the message processor determines whether the subscriber unit identified by the BS Service Request message is located within the service area of the base station. Also based on information stored in the mobile switching center's memory, the message processor determines whether the service option requested in the BS Service Request message is authorized for the particular subscriber unit. If both criteria are satisfied, the message processor authorizes the base station initiated call setup. Furthermore, the mobile switching center will determine if the call should be allowed based on information stored in its memory. The mobile switching center maintains information regarding the state of a subscriber unit. If the subscriber unit is already involved in a call, the mobile switching center may allow a call to proceed through service negotiation, or may disallow a call.

At the mobile switching center, to convey the outcome of processing the BS Service Request message, the message processor directs a message generator to generate a BS Service Response message. If the base station initiated call setup is not authorized, the BS Service Response message contains an element stating a reason for the non-authorization. The base station is informed if the call is not allowed. The BS Service Response message is transmitted by a transceiver in the mobile switching center, and received by a transceiver in the base station. If the base station initiated call setup is authorized and allowed, then the call may proceed in the same manner as a typical subscriber terminated call. A subscriber terminated call is a call made to a subscriber unit initiated by the mobile switching center/network. Thus, the subscriber unit will be paged, and a traffic channel will be established for the test call, packet data services call, etc. to proceed.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

The present invention provides a system and method for allowing a base station in a wireless communication system to initiate call setup. Base station initiated call setup is useful for several applications, such as conducting test calls and providing packet data services.

Figure 1:
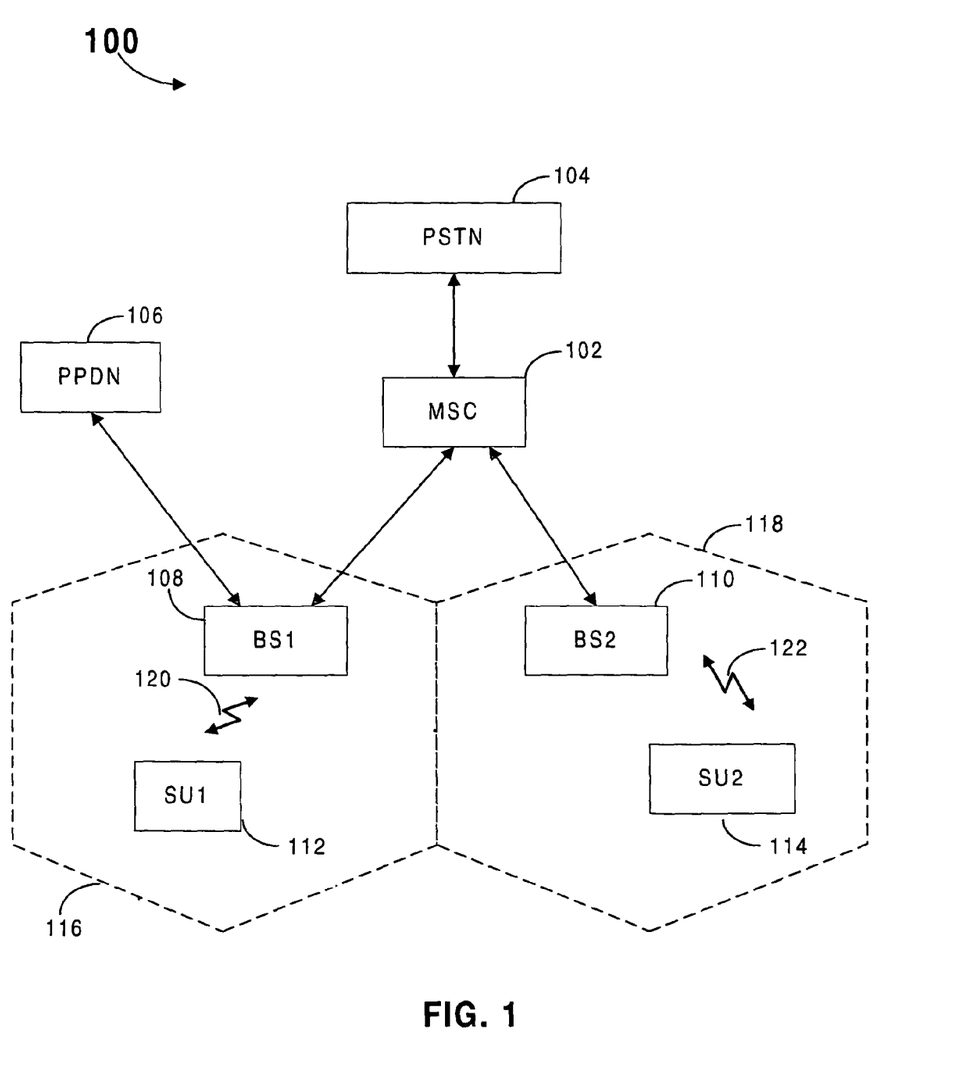
FIG. 1 is a block diagram of an exemplary wireless communication system.

An exemplary wireless communication system in which the present invention is embodied is illustrated in FIG. 1. In a preferred embodiment, the communication system is a CDMA wireless communications system, although it should be understood that the present invention is equally applicable to other types of communication systems. Systems utilizing other well known transmission modulation schemes such as TDMA and FDMA as well as other spread spectrum systems may employ the present invention.

The wireless system is indicated generally by 100 and includes a mobile switching center (MSC) 102, also referred to as a mobile telephone switching office (MTSO), that includes interface and processing circuitry for providing system control to the base stations. MSC 102 routes telephone calls from public switched telephone network (PSTN) 104 to the appropriate base station for transmission to the appropriate subscriber unit. MSC 102 also controls the routing of calls from the subscriber units via one or more base stations to PSTN 104. In addition, MSC 102 may direct calls between subscriber units via the appropriate base stations. MSC 102 may be coupled to the base stations by various conventional means, such as dedicated telephone lines, optical fiber links, or by radio frequency communications.

In FIG. 1, two exemplary base stations, BS1 108 and BS2 110, along with two exemplary subscriber units, SU1 112 and SU2 114 are illustrated. BS1 108 is shown to be interfaced with public/private packet data network (PPDN) 106. Although not illustrated in FIG. 1, a PPDN may also be interfaced with other base stations, such as BS2 110. Alternatively, a PPDN may be interfaced with MSC 102.

BS1 108 serves cell 1 116 of the cellular network by relaying messages between subscriber units located within cell 1 116 and MSC 102. Likewise, BS2 110 serves cell 2 118 of the cellular network by relaying messages between subscriber units located within cell 2 118 and MSC 102. As shown in FIG. 1, SU1 112 is located within cell 1 116, and SU2 114 is located within cell 2 118. SU1 112 and SU2 114 may be mobile stations (MSs) such as mobile telephones or Personal Communication System (PCS) stations, or some other wireless subscriber equipment such as the Fixed Wireless Terminal (FWT).

BS1 108 communicates with SU1 112 via link 120, which is a two-way link characterized by forward and reverse code channels. A forward link is the link from a base station to a subscriber unit, while a reverse link is the link from a subscriber unit to a base station. BS2 110 communicates with SU2 114 via two-way link 122.

As previously mentioned, the interface between BSs 108 and 110 and SUs 112 and 114 is called the air interface, and for the purposes of the present invention, call processing on the air interface is governed by IS-95-A. Also as previously mentioned, the interface between MSC 102 and BSs 108 and 110 is called the A interface, and call processing on the A interface is governed by IS-634. The present invention recognizes that the A interface as previously defined by IS-634 lacks support for a base station to initiate call setup.

Base station initiated call setup is needed to support various applications. One such application is base station initiated test calls. Test calls are used during the initial deployment and reengineering of a base station to obtain statistics and analysis data which are specific to the base station. A base station which is capable of initiating a call will be able to setup test calls for obtaining measurements such as the frame error rate and link capacity estimates.

Another application that may be supported by a base station initiated call setup is the delivery of packet data services calls. In certain communication networks, a packet data network may be coupled to a base station. When a call from the packet data network arrives for a subscriber unit, the base station must be able to initiate a call setup to deliver the packet call to the subscriber unit.

Still another application is the reactivation of a packet data services call which has entered a dormant mode. After a packet call is set up, it may enter a dormant mode if no packets are delivered for a period of time. If additional packets subsequently arrive, base station initiated call setup may be utilized to reactivate the call.

Figure 2:
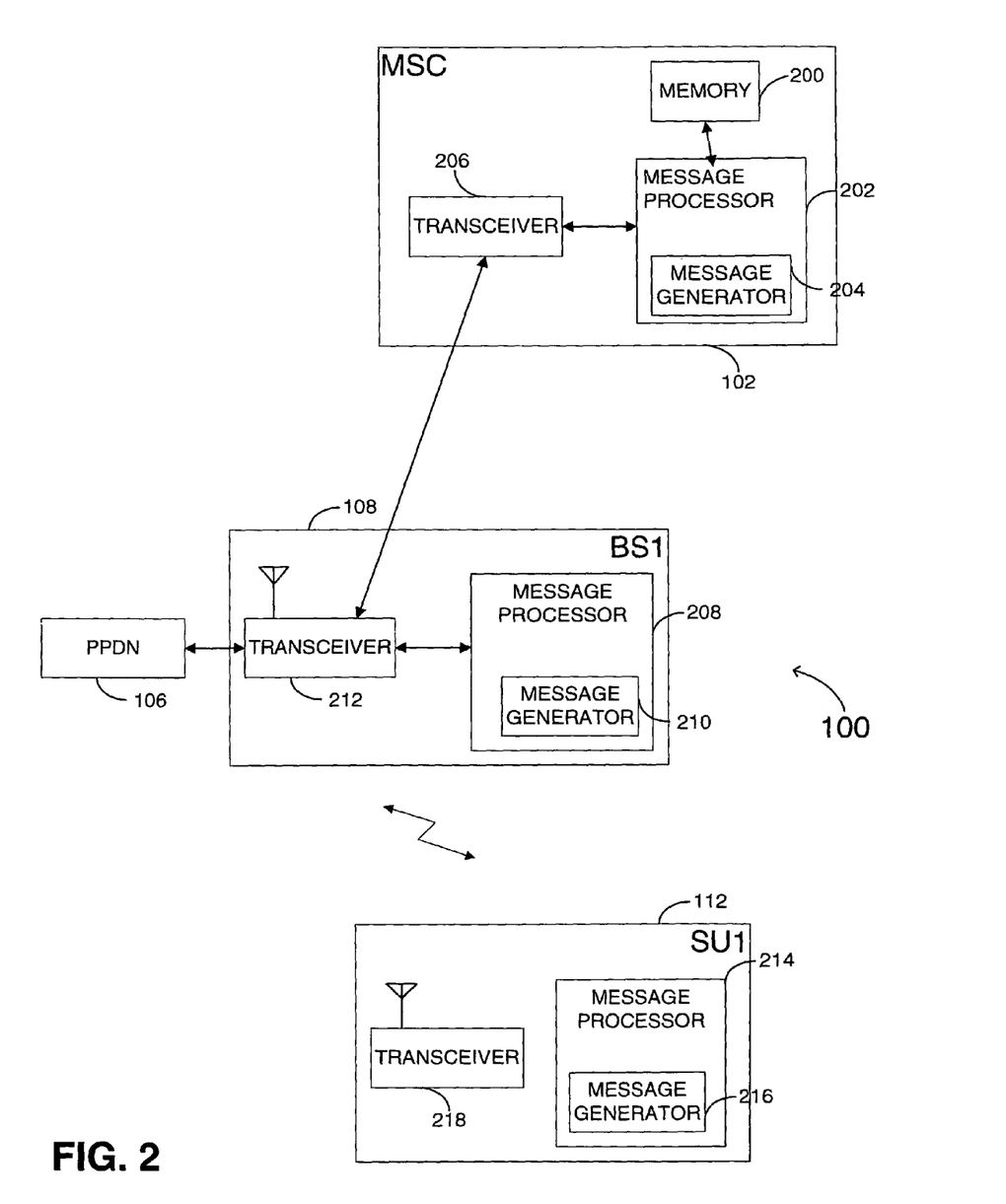
FIG. 2 is a block diagram illustrating a system for implementing base station initiated call setup in accordance with the present invention.

Accordingly, the present invention provides a system and method for a base station to initiate call setup. Referring now to FIG. 2, a system for implementing base station initiated call setup is illustrated. FIG. 2 is a diagram of a portion of system 100 of FIG. 1, illustrating the processing elements of MSC 102, BS1 108, and SU1 112 used for base station initiated call setup.

MSC 102 comprises memory 200 for storing information relating to subscriber units serviced by system 100. Such information includes the Subscribed Services Records, which contains a list of service options that a particular subscriber unit is authorized to use. Service options refer to the service capabilities of the system, and may be applications such as voice, data, facsimile, or SMS. Other information stored in memory 200 includes registration information for the subscriber units. Generally, each subscriber unit registers with MSC 102 on a regular basis. One function of registration is for the subscriber unit to report its location to MSC 102. MSC 102 also maintains information regarding the state of the subscriber units, i.e., whether each subscriber unit is in a call or not. MSC 102 also comprises message processor 202 which processes the messages associated with the base station call setup. Message generator 204 of message processor 202 generates the messages associated with the call setup. Transceiver 206 transmits and receives messages associated with the call setup.

BS1 108 comprises message processor 208 for processing the messages associated with a base station call setup, message generator 210 for generating messages associated with the call setup, and transceiver 212 for transmitting and receiving messages associated with the call setup.

Likewise, SU1 112 comprises message processor 214 for processing the messages associated with a base station call setup, message generator 216 for generating messages associated with the call setup, and transceiver 218 for transmitting and receiving messages associated with the call setup.

In accordance with the present invention, BS1 108 may initiate call setup to support a service provided by BS1 108. For example, BS1 108 may initiate call setup to conduct test calls during its initial deployment or reengineering. BS1 108 may also initiate call setup to deliver a packet call from PPDN 106 to SU1 112, or to reactivate a dormant call involving SU1 112.

FIG. 2 illustrates the processing elements involved in a call setup or a dormant call reactivation by BS1 108 directed to SU1 112. Upon initiating the call setup or dormant call reactivation, BS1 108 first notifies MSC 102 to set up a traffic channel either to deliver a subscriber terminated call or to reactivate a dormant call. (A subscriber terminated call is a call made to a subscriber such as SU1 112. BS1 108 has to seek authorization from MSC 102 to set up a call with SU1 112 because MSC 102 possesses information necessary for the call setup. Information such as the Subscribed Services Record and the registration information for a particular subscriber unit are stored in MSC 102 but unknown to BS1 108. Thus, a base station (BS) Service Request message is sent to MSC 102 to seek authorization for the BS initiated call setup. Also, MSC 102 stores information regarding the state of the particular subscriber unit. The state of the subscriber unit is used to determine whether the call setup or reactivation should be allowed. The BS Service Request message is transmitted by transceiver 212 of BS1 108 and received by transceiver 206.

At MSC 102, message processor 202 determines whether the call setup or reactivation with SU1 112 should proceed based on information stored in memory 200. Based on the Subscribed Services Record for SU1 112, message processor 202 will determine whether SU1 112 is authorized to use the service option that BS1 108 is asking for. In addition, based on the registration information for SU1 112, message processor 202 will determine whether SU1 112 is located within the service area of BS1 108. MSC 102 will authorize the call setup if SU1 112 is authorized to use the service option sought for and if SU1 112 is located within the service area of BS1 108. MSC 102 also determines if a call should be allowed based on the information regarding the state of SU1 112. If SU1 112 is already involved in a call, MSC 102 may allow the new call through service negotiation, or may disallow the new call. If SU1 112 is not already involved in a call, MSC 102 will allow the new call.

Message processor 202 directs message generator 204 to generate a BS Service Response message to convey the outcome of processing the BS Service Request message. If BS1 108 is not authorized to proceed with the call setup, then the reason for the authorization failure is provided in the BS Service Response message. The BS Service Response message is transmitted by transceiver 206 of MSC 102 and received by transceiver 212 of BS1 108. BS1 108 is also informed of whether the call setup is allowed.

If BS1 108 is authorized and allowed to proceed with the call setup, then BS1 108, SU1 112, and MSC 102 will exchange messages as they would in a typical subscriber terminated call. The processing elements of BS1 108, SU1 112, and MSC 102 will generate, transmit, and analyze messages as discussed in the above mentioned document for IS-95-A, Appendix B, page B-3, and as summarized below.

Figure 3:
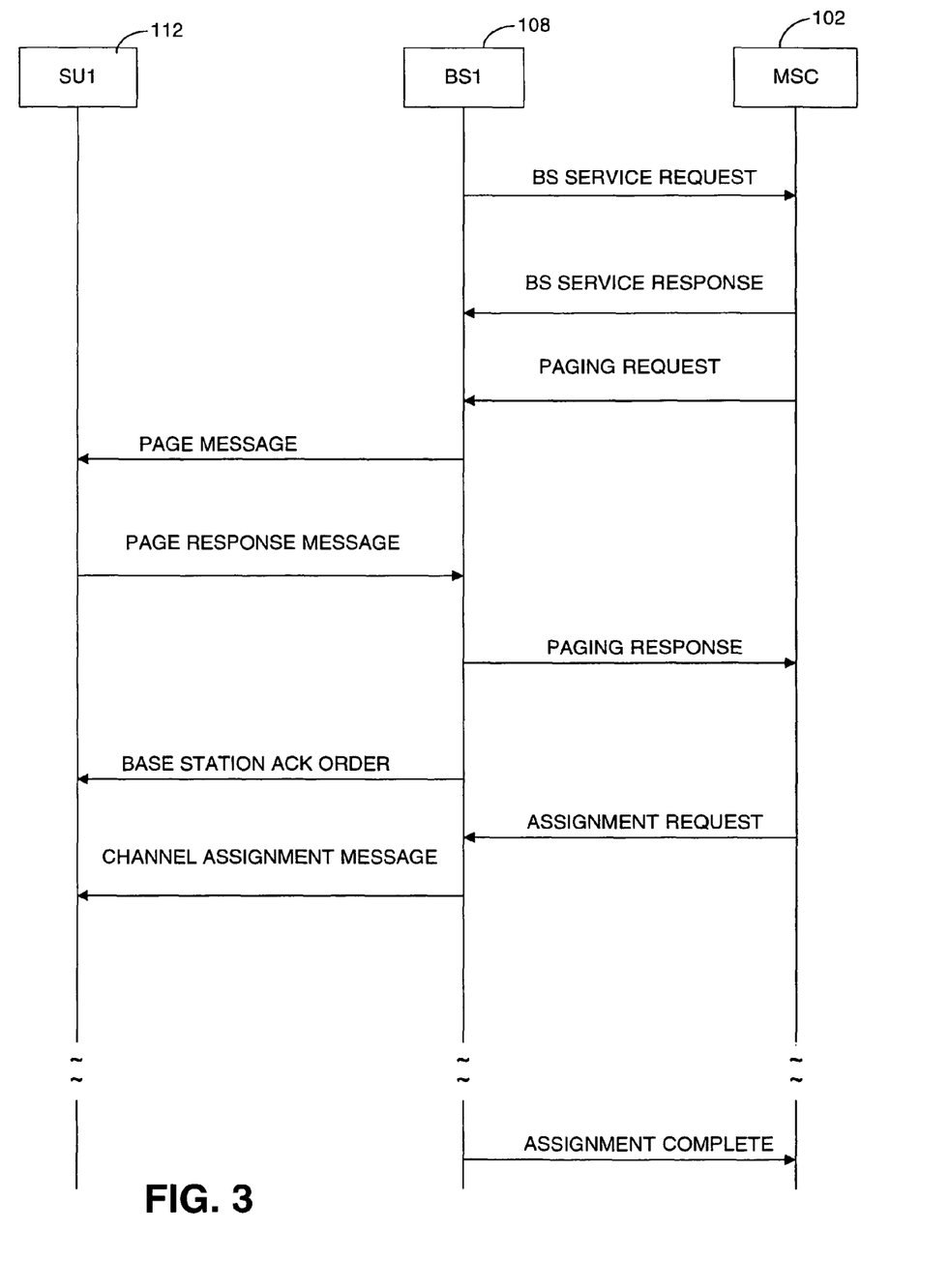
FIG. 3 is a flow diagram illustrating a base station initiated call setup procedure.

Referring now to FIG. 3 with reference to FIG. 2, a flow diagram is shown illustrating the messages transmitted between the processing elements of FIG. 2 during a base station initiated call setup. As in FIG. 2, BS1 108 is initiating a call setup for a call terminating to SU1 112.

A BS Service Request message is transmitted from BS1 108 to MSC 102, requesting the base station initiated call setup. The BS Service Request message contains a Mobile Identity element to identify the subscriber unit to which the call setup is directed. In this case, the subscriber unit is SU1 112. The BS Service Request message also contains a Service Option element which indicates the type of service option that BS1 108 is seeking for SU1 112. The Service Option element may, for example, indicate that BS1 108 wishes to conduct a loop-back test call or a Markov test call with SU1 112. If a packet data services call from PPDN 106 is directed to SU1 112, the Service Option element will indicate that a packet data call is to be set up. In addition, the BS Service Request message contains a Tag element, which serves as a reference for the particular message.

In response to the BS Service Request message, MSC 102 sends a BS Service Response message to BS1 108, conveying the outcome of processing the BS Service Request message. The BS Service Response message contains a Tag element, which echoes the Tag value of the BS Service Request message being responded to. The Tag value will allow BS1 108 to correlate the BS Service Response message with the proper BS Service Request message. If MSC 102 decides not to proceed with the base station initiated call setup, the BS Service Response message will also contain a Cause element. The Cause element indicates the reason for not granting the BS service request.

MSC 102 will not authorize the call setup if the subscriber unit (SU1 112) is not located within the service area of BS1 108. MSC 102 uses the registration information stored in its memory to determine if the SU1 112 is available to BS1 108. MSC 102 will also deny authorization for the call setup if the service option indicated by the Service Option element of the BS Service Request message is not authorized for SU1 112. The Subscribed Services Record for SU1 112, stored in MSC 102, provides information on whether a particular service option is authorized for SU1 112. MSC 102 may or may not allow the call setup depending on the state SU1 112, i.e., whether or not SU1 112 is already involved in a call.

If the base station initiated call setup is authorized by MSC 102, then the call proceeds in the same way as a typical subscriber terminated call setup. Generally, MSC 102 will transmit to BS1 108 a Paging Request message, specifying the service option for the call being set up. In turn, BS1 108 sends a Page Message to SU1 112, paging SU1 112 for the call. Recall that BS1 108 may be initiating a call setup with SU1 112 to conduct a test call or to deliver a packet data services call from PPDN 106. Upon receipt of the Page Message, SU1 112 responds by transmitting a Page Response message to BS1 108, which in turn transmits a Paging Response message to MSC 102.

BS1 108 acknowledges the receipt of the Page Response message from SU1 108 by sending it a Base Station Acknowledgment Order. MSC 102 sends an Assignment Request message to BS1 108 to request assignment of radio resources. Typically, BS1 108 will then send a Channel Assignment Message to SU1 112 to initiate the establishment of a radio traffic channel, if SU1 112 is not already on a traffic channel. A number of messages are then exchanged between SU1 112 and BS1 108 to complete establishment of the radio traffic channel. Then, BS1 108 transmits to MSC 102 an Assignment Complete message, informing MSC 102 that the base station initiated call setup has been successful. The test call, packet data services call, etc. may then proceed.

In accordance with the present invention, a system and method is provided for performing base station initiated call setup. Base station initiated call setup may be used to conduct test calls, which are important during the initial deployment and reengineering of the base station. Base station initiated call setup may also be used to deliver packet data calls to a subscriber unit or to reactivate dormant packet calls when packets arrive from a packet data network connected to the base station.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for base station initiated servicing of a mobile station, comprising:
   transmitting a base station initiated call setup request from a base station to a mobile switching center requesting to setup a call for servicing said mobile station; and
   receiving at said base station from said mobile switching center a paging request for paging said mobile station upon receiving, from said mobile switching center, authorization for the base station initiated call setup, the authorization being based on one or more authorization factors for servicing said mobile station.

2. The method as in claim 1 further including receiving at said base station from said mobile switching center a response having information concerning servicing said mobile station prior to receiving said paging request.

3. The method as in claim 2 wherein said information includes a service option for servicing said mobile station.

4. The method as in claim 2 further including conducting a loopback test in servicing said mobile station.

5. The method as in claim 1 further including conducting a Markov test in servicing said mobile station.

6. The method as in claim 1 further including initiating a packet data call set up for delivery of data packets in servicing said mobile station.

7. The method as in claim 1 further including reactivating a packet data call set up for delivery of data packets in serving said mobile station operating under a dormant mode.

8. The method of claim 1, wherein the one or more authorization factors comprise at least one of whether the mobile station is authorized to use the service requested by the base station, whether the mobile station is located within the service area of the base station, or whether the mobile station is already involved in a call.

9. A method for a mobile station to receive base station initiated service from a base station, comprising:
   receiving a paging message from said base station which has initiated a request to setup a call for servicing said mobile station to a mobile switching center; and
   responding to said paging message, said paging message being received from said base station upon receiving, from said mobile switching center, authorization for the base station initiated call setup, the authorization being based on one or more authorization factors for servicing said mobile station.

10. The method as in claim 9 further including conducting a loopback test in servicing said mobile station.

11. The method as in claim 9 further including conducting a Markov test in servicing said mobile station.

12. The method as in claim 9 wherein said base station directly communicates with a packet data network, said method further including initiating a packet data call set up for delivery of data packets in servicing said mobile station.

13. The method as in claim 9 wherein said base station directly communicates with a packet data network, said method further including reactivating a packet data call set up for delivery of data packets in serving said mobile station operating under a dormant mode.

14. The method of claim 9, wherein the one or more authorization factors comprise at least one of whether the mobile station is authorized to use the service requested by the base station, whether the mobile station is located within the service area of the base station, or whether the mobile station is already involved in a call.

15. An apparatus for base station initiated servicing of a mobile station, comprising:
   means for transmitting a base station initiated call setup request to a mobile switching center requesting to setup a call for servicing said mobile station; and
   means for receiving from said mobile switching center a paging request for paging said mobile station upon receiving, from said mobile switching center, authorization for the base station initiated call setup, the authorization being based on one or more authorization factors for servicing said mobile station.

16. The apparatus as in claim 15 further including means for receiving from said mobile switching center a response to said request for servicing prior to receiving said paging request, wherein said response comprises information concerning servicing said mobile station.

17. The apparatus as in claim 16 wherein said information includes a service option for servicing said mobile station.

18. The apparatus as in claim 15 further including means for conducting a loopback test in servicing said mobile station.

19. The apparatus as in claim 15 further including means for conducting a Markov test in servicing said mobile station.

20. The apparatus as in claim 15 wherein said base station communicates directly with a packet data network.

21. The apparatus as in claim 15 further including means for initiating a packet data call set up for delivery of data packets in servicing said mobile station.

22. The apparatus as in claim 15 further including means for reactivating a packet data call set up for delivery of data packets in serving said mobile station operating under a dormant mode.

23. The apparatus of claim 15, wherein the one or more authorization factors comprise at least one of whether the mobile station is authorized to use the service requested by the base station, whether the mobile station is located within the service area of the base station, or whether the mobile station is already involved in a call.

24. A mobile station for receiving base station initiated service from a base station, comprising:
   means for receiving a paging message from said base station which has initiated a request to setup a call for servicing said mobile station to a mobile switching center; and
   means for responding to said paging message, said paging message being received from said base station upon receiving, from said mobile switching station, authorization for the base station initiated call setup, the authorization being based on one or more authorization factors for servicing said mobile station.

25. The mobile station as in claim 24 further including means for conducting a loopback test in servicing said mobile station.

26. The mobile station as in claim 24 further including means for conducting a Markov test in servicing said mobile station.

27. The mobile station as in claim 24 wherein said base station directly communicates with a packet data network and includes means for initiating a packet data call set up for delivery of data packets in servicing said mobile station.

28. The mobile station as in claim 24 wherein said base station directly communicates with a packet data network and includes means for reactivating a packet data call set up for delivery of data packets in servicing said mobile station operating under a dormant mode.

29. The mobile station of claim 24, wherein the one or more authorization factors comprise at least one of whether the mobile station is authorized to use the service requested by the base station, whether the mobile station is located within the service area of the base station, or whether the mobile station is already involved in a call.

30. An apparatus for base station initiated servicing of a mobile station, comprising:
   a processor configured to transmit a base station initiated call setup request to a mobile switching center requesting to setup a call for servicing said mobile station; and
   a receiver configured to receive, from said mobile switching center, a paging request for paging said mobile station upon receiving, from said mobile switching center, authorization for the base station initiated call setup, the authorization being based on one or more authorization factors for servicing said mobile station.

31. The apparatus of claim 30, wherein the receiver is further configured to receive, at said base station from said mobile switching center, a response having information concerning servicing said mobile station prior to receiving said paging request.

32. The apparatus of claim 30 wherein said information includes a service option for servicing said mobile station.

33. The apparatus of claim 30, wherein the processor is further configured to perform a loopback test in servicing said mobile station.

34. The apparatus of claim 30, wherein the processor is further configured to conduct a Markov test in servicing said mobile station.

35. The apparatus of claim 30, wherein the processor is further configured to initiate a packet data call set up for delivery of data packets in servicing said mobile station.

36. The apparatus of claim 30, wherein the processor is further configured to reactivate a packet data call set up for delivery of data packets in serving said mobile station operating under a dormant mode.

37. The apparatus of claim 30, wherein the one or more authorization factors comprise at least one of whether the mobile station is authorized to use the service requested by the base station, whether the mobile station is located within the service area of the base station, or whether the mobile station is already involved in a call.

38. At least one processor configured to perform a method for base station initiated servicing of a mobile station, the method comprising:
   transmitting a base station initiated call setup request from a base station to a mobile switching center requesting to setup a call for servicing said mobile station; and
   receiving at said base station from said mobile switching center a paging request for paging said mobile station upon receiving, from said mobile switching center, authorization for the base station initiated call setup, the authorization being based on one or more authorization factors for servicing said mobile station.

39. A mobile station for receiving base station initiated service from a base station, comprising:
   a receiver configured to receive a paging message from said base station which has initiated a request to setup a call for servicing said mobile station to a mobile switching center; and
   a processor configured to respond to said paging message, said paging message being received from said base station upon receiving, from said mobile switching center, authorization for the base station initiated call setup, the authorization being based on one or more authorization factors for servicing said mobile station.

40. The mobile station of claim 39, wherein the processor is further configured to conduct a loopback test in servicing said mobile station.

41. The mobile station of claim 39, wherein the processor is further configured to conduct a Markov test in servicing said mobile station.

42. The mobile station of claim 39, wherein said base station directly communicates with a packet data network, and wherein the processor is further configured to initiate a packet data call set up for delivery of data packets in servicing said mobile station.

43. The mobile station of claim 39, wherein said base station directly communicates with a packet data network, and wherein the processor is further configured to reactivate a packet data call set up for delivery of data packets in serving said mobile station operating under a dormant mode.

44. The mobile station of claim 39, wherein the one or more authorization factors comprise at least one of whether the mobile station is authorized to use the service requested by the base station, whether the mobile station is located within the service area of the base station, or whether the mobile station is already involved in a call.

45. At least one processor configured to perform a method for a mobile station to receive base station initiated service from a base station, the method comprising:
   receiving a paging message from said base station which has initiated a request to setup a call for servicing said mobile station to a mobile switching center; and
   responding to said paging message, said paging message being received from said base station upon receiving, from said mobile switching center, authorization for the base station initiated call setup, the authorization being based on one or more authorization factors for servicing said mobile station.

* * * * *